United States Patent
Barndt (10) Patent No.: US 9,430,326 B2
(45) Date of Patent: Aug. 30, 2016

(54) MULTIPLE ECC CODEWORD SIZES IN AN SSD

(71) Applicant: HGST Netherlands B.V., Amsterdam (NL)

(72) Inventor: Richard David Barndt, San Diego, CA (US)

(73) Assignee: HGST Netherlands B.V., Amsterdam (NL)

( * ) Notice: Subject to any disclaimer, the term of this patent is extended or adjusted under 35 U.S.C. 154(b) by 77 days.

(21) Appl. No.: 14/338,264

(22) Filed: Jul. 22, 2014

(65) Prior Publication Data

US 2016/0026525 A1  Jan. 28, 2016

(51) Int. Cl.
*G11C 29/00* (2006.01)
*G06F 11/10* (2006.01)

(52) U.S. Cl.
CPC .................. *G06F 11/1068* (2013.01)

(58) Field of Classification Search
CPC ................................................. G06F 11/1068
See application file for complete search history.

(56) References Cited

U.S. PATENT DOCUMENTS

| | | | |
|---|---|---|---|
| 8,601,352 B1 | 12/2013 | Anholt et al. | |
| 8,650,458 B2 | 2/2014 | Kim et al. | |
| 8,650,467 B1 | 2/2014 | Anholt | |
| 2012/0242517 A1* | 9/2012 | Seo | H03M 7/40 341/52 |
| 2013/0031301 A1 | 1/2013 | Barndt | |
| 2013/0060992 A1* | 3/2013 | Cho | G06F 12/0246 711/103 |
| 2013/0198577 A1 | 8/2013 | Oh et al. | |
| 2014/0059401 A1 | 2/2014 | Chung et al. | |
| 2014/0337682 A1* | 11/2014 | Prodan | H03M 13/116 714/755 |

FOREIGN PATENT DOCUMENTS

CN  101964205  2/2011

OTHER PUBLICATIONS

Micron Technical Note TN-29-63: Error Correction Code (ECC) in Micron Single-Level Cell (SLC) NAND, Micron Technology, Inc. 2011, 12 pages.
Lee, et al., "6.4 Gb/s multi-threaded BCH encoder and decoder for multi-channel SSD controllers," 2012 IEEE Solid-State Circuits Conference.

* cited by examiner

*Primary Examiner* — Bryce Bonzo
*Assistant Examiner* — Thien D Nguyen
(74) *Attorney, Agent, or Firm* — McDermott Will & Emery LLP (57) ABSTRACT

Methods for writing multiple codewords having multiple sizes to a solid-state device are provided. In one aspect, a method includes receiving a plurality of host data units for storage in a solid-state non-volatile memory. The method includes dividing the plurality of host data units among a plurality of data payloads, wherein a first data payload comprises a first host data unit and a second data payload comprises a portion of a second host data unit. The method includes encoding the first data payload into a first codeword having a first codeword size. The method includes encoding the second data payload into a second codeword having a second codeword size, the second codeword size being different from the first codeword size. The method includes writing the first codeword and the second codeword to a first page in the solid-state non-volatile memory. Systems and machine-readable media are also provided.

19 Claims, 3 Drawing Sheets

MULTIPLE ECC CODEWORD SIZES IN AN SSD

BACKGROUND

The subject technology generally relates to solid-state storage devices. Host data may be reliably stored in a data storage medium such as flash memory by encoding the host data into error-correcting code (ECC) codewords and storing the codewords on the data storage medium. In response to a read command, the codewords may be read from the data storage medium and decoded before passing the error free host data back to the host. The size of a sector of host data may vary based on the host system. For example, in enterprise applications, host sector size may be 536 bytes before adding ECC parity bits compared to 512 bytes used in many consumer applications. Host sectors of different sizes may add complexity to, and compromise the performance of, a flash memory based data storage system like a solid-state device (SSD).

SUMMARY

A system and method for storing data in a solid-state device is disclosed. According to one aspect, a method may include receiving a plurality of host data units for storage in a flash memory, dividing the plurality of host data units among a plurality of data payloads, wherein a first data payload comprises a first host data unit and a second data payload comprises a portion of a second host data unit, encoding the first data payload into a first codeword having a first codeword size, encoding the second data payload into a second codeword having a second codeword size, the second codeword size being different from the first codeword size, and writing the first codeword and the second codeword to a first page in the flash memory. In another aspect, a machine-readable media may include instructions thereon that, when executed, perform the previously described method.

In a further aspect, a system may include a flash memory, one or more data buffers configured to receive a plurality of host data units for storage in the flash memory, a controller configured to divide the plurality of host data units in the one or more data buffers among a plurality of data payloads, wherein a first data payload comprises a first host data unit and a second data payload comprises a portion of a second host data unit, and an encoder/decoder configured to encode the first data payload into a first codeword having a first codeword size; encode the second data payload into a second codeword having a second codeword size, the second codeword size being different from the first codeword size, wherein the controller is further configured to write the first codeword and the second codeword to a first page in the flash memory.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

A detailed description will be made with reference to the accompanying drawings.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology may be practiced without these specific details. In some instances, structures and components are shown in block diagram form in order to avoid obscuring the concepts of the subject technology Like components are labeled with identical element numbers for ease of understanding.

Flash memory is organized into blocks of flash memory cells. Each block includes a number of pages that may contain thousands of bits. Data is written to and read from flash memory in units of pages. However, flash memory must be erased in units of blocks. Data may be written to flash memory pages sequentially across flash memory devices. Sequential pages may be written on different flash memory devices via separate channels, which would allow the sequential pages to be read in parallel by sending read commands to each respective flash memory device via the separate channels. In this way, data retrieval from flash memory may be accomplished quickly.

Some manufacturers of flash memory devices may configure flash memory pages that are sized to hold multiples of 512 bytes plus some extra space for the ECC overhead. However, in an enterprise SSD, the host data units (or sectors) to be stored on the SSD may not align with the flash memory pages. For example, the enterprise host data units may be larger than 512 bytes, such as 528 bytes or 536 bytes, which may reduce the amount of space for the ECC parity bits. In addition, the specified ECC format may be insufficient to reach the desired number of program/erase cycles with the required uncorrectable bit error rate because the raw bit error rate from the flash memory increases as it wears out.

When writing host data units larger than 512 bytes in an SSD that is configured for 512 byte host data units, the SSD may either stop short of filling a whole page in flash memory because undivided codewords will not fill the page, or split some of the codewords across two pages. The former may be expensive because more flash memory is required to store the same amount of host data. The latter may require reading two pages to retrieve the codeword(s) for a single host data unit, which ties up resources in the SSD while waiting to retrieve both pages.

ECC decoding cannot be started until the entire codeword has been retrieved from the flash memory. However, in order to maximize usage of storage space in the flash memory, a codeword may be split across two flash memory pages. For example, if a flash memory page has a size of 16 kB and each codeword has a size of 4 kB plus ECC parity bits, three complete codewords may be written to the flash memory page, but a fourth complete codeword may not fit on the flash memory page because of the space occupied by the ECC parity bits of each codeword. Instead of leaving the space remaining on the flash memory page empty, the next codeword may be split across two flash memory pages. In this example, 3 kB of the 4 kB codeword may be written to the flash memory page and the remaining 1 kB of the 4 kB codeword may be written to another flash memory page.

However, if a codeword is split across two flash memory pages, the decoder must wait for both pages to be read, which could require holding the first received portion in a buffer until the second portion is received. For more advanced ECC systems such as low-density parity check (LDPC), the consequences may be more severe because the error characteristics of the two pages may require different handling. Therefore, it is undesirable for a codeword to cross page boundaries and also undesirable to not maximize usage of storage space in the flash memory.

Instead of splitting a codeword that will not fit on one page across two pages, the subject technology divides the host data unit into two separate codewords and writes the two codewords on adjacent pages. In this way, each codeword does not cross page boundaries and storage space in the flash memory may be maximized.

A single ECC encoder/decoder may be designed to switch codeword lengths using the same number of parity bits in both the longest and shortest codewords. For example, the same number of parity bits may be used for a 1 kB codeword as a 4 kB codeword. The 1 kB codeword may be overprotected by the ECC, as it may not require as many parity bits as those provided by the ECC, but any extra space occupied by the excess parity bits is small compared to the gain obtained from reducing the number of unused bits in the page by having additional, smaller codewords. Also, if the bulk of all host data is contained in the longest codewords then the performance of the multiple codeword size system will approach that of a fixed size system using only the longest codewords, and read amplification may be minimized as well.

Figure 1:
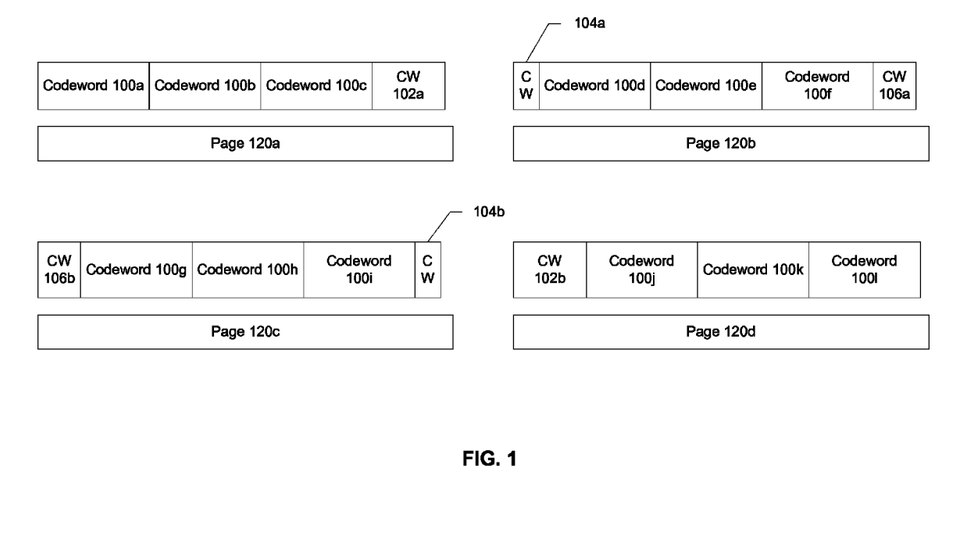
FIG. 1 depicts a block diagram illustrating an example series of codewords, including host data and error correction coding, stored across multiple pages of a memory block according to aspects of the subject technology.

FIG. 1 depicts a block diagram illustrating an example series of codewords stored across multiple pages of a flash memory block according to one aspect of the subject technology. Each codeword 100a-100l, 102a-102b, 104a-104b, 106a-106b contains host data and error correction coding. The size of each codeword is selected from a list of possible codeword sizes. For example, in FIG. 1, codewords 100a-100l are all of a first size, codewords 102a-102b are a second size, codewords 104a-104b are of a third size, and codewords 106a-106b are of a fourth size.

The subject technology generates and provides codewords 100a-100l, 102a-102b, 104a-104b, 106a-106b that occupy as much of each flash memory page 120a-120d as possible. For example, after writing codewords 100a-100c to page 120a, the largest codeword size that will fit in the remaining space of page 120a is codeword 102a, which is of the second size. By using a codeword the size of codeword 102a, as much of the flash memory page 120a-120d is used as possible, as opposed to if codeword 104a or codeword 106a were written to page 120a. While the combination of codewords 100a-100c and 102a may not occupy all of page 120a, substantially all of page 120a is occupied. In some aspects, if the amount of space left in a particular page is less than the smallest codeword size, then substantially all of the page is occupied.

Figure 2:
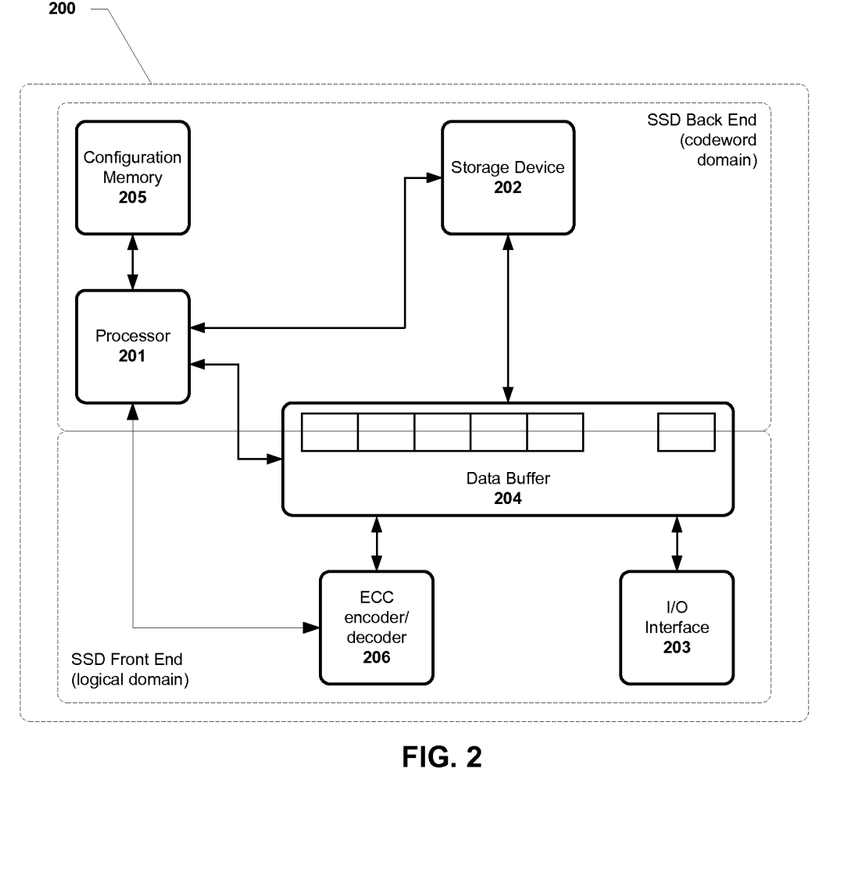
FIG. 2 depicts a block diagram illustrating components of a solid-state device configured to store data received from a host system according to aspects of the subject technology.

FIG. 2 depicts a block diagram illustrating components of a solid-state device configured to store data received from a host system according to aspects of the subject technology. Data storage system 200 includes a processor 201 (for example, a data storage or SSD controller, a microprocessor, or the like), one or more storage devices 202 (for example, flash memory devices or other types of storage devices such as random-access memory, optical or magnetic media devices), an input/output (I/O) interface 203, a data buffer 204, a configuration memory 205, and an ECC encoder/decoder 206.

Data buffer 204 provides a hardware mechanism for facilitating the separation of the SSD front end which interfaces with a host system, and the SSD back end which interfaces with storage device 202. Data is temporarily stored in data buffer 204 when received for storage via I/O interface 203 from a host system, or when retrieved from storage device 202 for transmission via I/O interface 203 to the host system. When functioning to facilitate storage, data buffer 204 may be partitioned to divide temporarily stored data therein and create appropriately sized data payloads for encoding into codewords for use by the SSD back end. In this manner, the SSD back end is concerned with encoding data payloads into codewords that will fit within the page boundaries of storage device 202, and decoding codewords retrieved from storage device 202 back into the same sized data payloads. On the other hand, the SSD front end is concerned with receiving and sending host data units.

Data buffer 204 may be realized by volatile or non-volatile memory, and may include one or more blocks, pages, or other units of memory. The functionality of data buffer 204 and storage device 202 may be implemented in the same storage device or distributed across a group of storage devices. Moreover, the storage devices may take any form such as flash memory, RAM, optical or magnetic media, or the like. In one example, data buffer 204 is a section of memory reserved (for example, dynamically at runtime) within one or more storage devices 202.

Data storage system 200 may include machine-readable media (for example, non-transitory media), including instructions thereon that, when executed, facilitate the transfer of data between I/O interface 203, data buffer 204, and storage device 202, and other methods transmission and/or modification of the data described herein. In one example, data storage system 200 receives a host data unit from a host device. The host data unit may include one or more sectors of data or other units of data sized according to the host device. The host data units may each have the same size, and the size may be determined by the host system. The host system may include, for example, a microprocessor, external memory, and/or peripheral components operating in concert with a data storage system that includes the storage device.

Data received from a host may be stored in storage device 202 by encoding the data payload from a host data unit into a codeword, and storing the codeword in the storage device 202. The host data unit is received from the host, into data buffer 204, and data buffer 204 stores the host data unit in a data payload. The data payload is encoded by ECC encoder/decoder 206 and the data buffer 204 facilitates populating one or more codewords of one or more sizes from the data payload. In some aspects, the available codeword sizes are based on the capabilities of the ECC encoder/decoder 206. For example, the ECC encoder/decoder 206 may be capable of encoding and decoding 1 kB codewords, 2 kB codewords, 3 kB codewords, and 4 kB codewords. In some aspects, the controller 201 indicates to the ECC encoder/decoder 206 the size of codeword to use in encoding a particular data payload. In some aspects, the ECC encoder/decoder 206 may dynamically determine which size codeword to use based on the size of the data payload to be encoded.

ECC encoder/decoder 206 throughput may be measured in codewords per second. For example, the ECC encoder/decoder 206 may take the same amount of time to encode a 4 kB codeword as a 1 kB codeword. In this case, having codewords of as large a size as possible is desirable, as the time taken to encode one 4 kB codeword is less than the time taken to encode four 1 kB codewords. Alternatively, ECC encoder/decoder 206 throughput may be measured in bytes per second. For example, the ECC encoder/decoder 206 may take a shorter time to encode a 1 kB codeword than a 4 kB codeword. In this case, using smaller codewords may still not be as efficient as using longer codewords because there may be a per-codeword processing time.

In the described example, data storage system 200 may divide a received host data unit between two data payloads. The first data payload may encoded in a first codeword and the second data payload may be encoded in a second codeword. As described above, the size of the codeword to be encoded for each data payload may be determined by the controller 201 and indicated to the ECC encoder/decoder 206. The construction of the codewords may take place in data buffer 204. The data buffer 204 may store host data received from the host, the data buffer 204 may store data payloads created by the controller 201, and the data buffer 204 may store encoded codewords ready to be written to the storage device 202.

After the codewords have been generated, the codewords may be written to one or more pages of flash memory. In some aspects, the codewords may be stored at respective addresses of a flash memory page. In one aspect, the codewords may be stored sequentially. In the described example, the first codeword containing the first portion of the received host data unit may be written to a first page and the second codeword containing the second portion of the received host data unit may be written to a second page. As described above, the first and second pages may be adjacent pages, as flash memory pages are written sequentially. The respective addresses at which each codeword are stored may be predetermined, or determined at runtime, based on the codeword length, flash memory page size, and a starting address of a respective flash memory page and stored, for example, in configuration memory 205. Configuration memory 205 may include a lookup table, and, before storing or retrieving a codeword from storage device 202, processor 201 may retrieve, from the lookup table, a respective address associated with the codeword.

In some aspects, the SSD controller maintains a virtual address of each host data unit stored in the flash memory. When host data is received for storage, the host data units are associated with respective logical addresses. The controller maps respective logical addresses of host data units to virtual addresses of corresponding data codewords into which the host data units were encoded. In this manner, each host data unit may be accounted for among the plurality of data codewords after they are stored. The virtual address of each of the plurality of codewords is then mapped to a physical address in the flash memory. Accordingly, the SSD controller knows the location of each host data unit, even if that host data unit begins at a location within a codeword (for example, at the beginning data position), falls entirely within a single codeword, crosses codeword boundaries, or even crosses flash memory page boundaries. In one example, the mapping of the logical address includes an offset value for each of the first virtual addresses so that a host data unit may be indexed and retrieved from one or more data payloads encoded into a single codeword or between multiple codewords.

Similarly, the SSD controller may store the one or more codewords at respective offset addresses, the offset addresses being based on the codeword length, flash memory page size, and a starting address of a flash memory page. Accordingly, storing the codewords in the storage device may include retrieving, from a lookup table, a respective offset address associated with a flash memory page of the storage device, and storing a respective codeword at the respective offset address.

With further reference to FIG. 2, processor 201 may function as a SSD controller. processor 201 may use configuration memory 205 for temporary storage of data and information used to manage data storage system 200. Processor 201 may include several internal components (not shown) such as a read-only memory, a flash memory component interface (for example, a multiplexer to manage instruction and data transport along a serial connection to storage device 202), an I/O interface, error correction circuitry, and the like. In some aspects, all of these elements of controller 201 may be integrated into a single chip. In other aspects, these elements may be separated on their own PC board.

Processor 201 may also be configured to execute code or instructions to perform the operations and functionality described herein, manage request flow and address mappings, and to perform calculations and generate commands. Processor 201 is configured to monitor and control the operation of the components of system 200. The processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or a combination of the foregoing. One or more sequences of instructions may be stored as firmware on ROM within processor 201 and/or its processor. One or more sequences of instructions may be software stored and read from storage medium 205, storage device 202, or received from a host device (for example, via I/O interface 203). ROM, storage medium 205, storage device 202, represent examples of machine or computer readable media (for example, non-transitory media) on which instructions/code executable by processor 201 and/or its processor may be stored. Machine or computer readable media may generally refer to any medium or media used to provide instructions to processor 201 and/or its processor, including both volatile media, such as dynamic memory used for storage media 205 or for buffers within processor 201, and non-volatile media, such as electronic media, optical media, and magnetic media.

In some aspects, storage device 202 includes flash memory. Processor 201 is configured to store, in storage device 202, data received from a host device (for example, the previously described host sector data) in response to a write command from the host device. Processor 201 is further configured to read data stored in storage device 202 and to transfer the read data to the host device in response to a read command from the host device. A host device may be any device configured to be coupled to data storage system 200 via I/O interface 203 and to store data in data storage system 200. The host device may be a computing system such as a personal computer, a server, a workstation, a laptop computer, PDA, smart phone, and the like. Alternatively, a host device may be an electronic device such as a digital camera, a digital audio player, a digital video recorder, and the like.

In some aspects, configuration memory is a storage medium. In this regard, storage medium 205 represents volatile memory used to temporarily store data and information used to manage data storage system 200. According to one aspect of the subject technology, storage medium 205 is random access memory (RAM) such as double data rate (DDR) RAM. Other types of RAM also may be used to implement storage medium 205. Memory 205 may be implemented using a single RAM module or multiple RAM modules. While storage medium 205 is depicted as being distinct from processor 201, those skilled in the art will recognize that storage medium 205 may be incorporated into processor 201 without departing from the scope of the subject technology. Alternatively, storage medium 205 may be a non-volatile memory such as a magnetic disk, flash memory, peripheral SSD, and the like.

As further depicted in FIG. 2, data storage system 200 may also include I/O interface 203 (for example, a host interface). I/O interface 203 is configured to be coupled to a host device, to receive data from the host device and to send data to the host device. I/O interface 203 may include both electrical and physical connections for operably coupling the host device to processor 201, for example, via the I/O interface of processor 201. I/O interface 203 is configured to communicate data, addresses, and control signals between a host device and processor 201. Alternatively, the I/O interface of processor 201 may include and/or be combined with I/O interface 203. I/O interface 203 may be configured to implement a standard interface, such as Serial-Attached SCSI (SAS), Fiber Channel interface, PCI Express (PCIe), SATA, USB, and the like. I/O interface 203 may be configured to implement only one interface. Alternatively, I/O interface 203 (and/or the I/O interface of processor 201) may be configured to implement multiple interfaces, which are individually selectable using a configuration parameter selected by a user or programmed at the time of assembly. I/O interface 203 may include one or more buffers for buffering transmissions between a host device and processor 201.

Storage device 202 represents a non-volatile memory device for storing data. According to aspects of the subject technology, storage device 202 includes, for example, NAND flash memory. Storage device 202 may include a single flash memory device or chip, as depicted by FIG. 2, or may include multiple flash memory devices or chips arranged in multiple channels. Flash memory is not limited to any particular capacity or configuration. For example, the number of physical blocks, the number of physical pages per physical block, the number of sectors per physical page, and the size of the sectors may vary within the scope of the subject technology.

Figure 3:
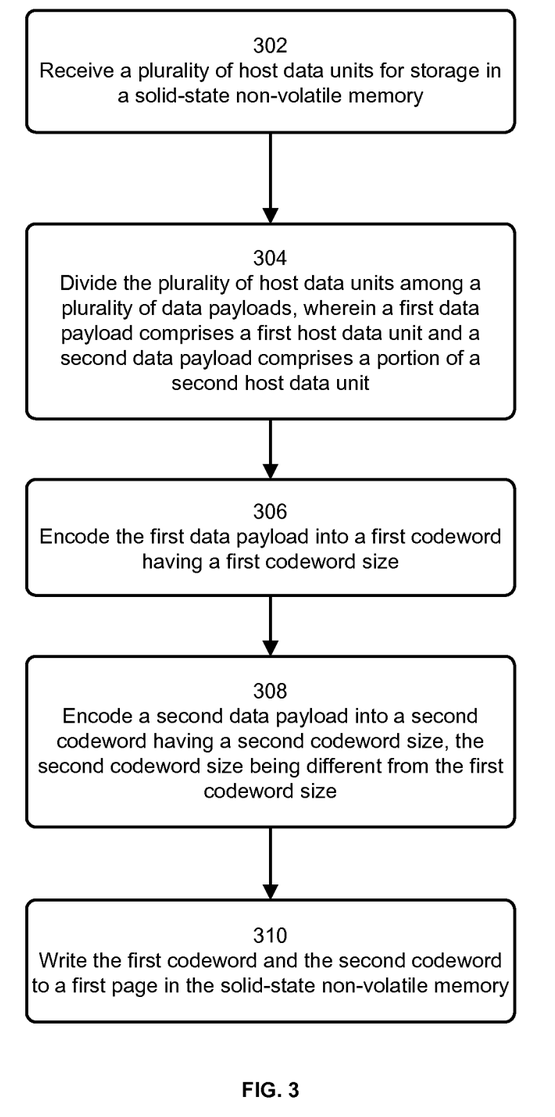
FIG. 3 is a flowchart illustrating an example process for storing data in a solid-state device according to aspects of the subject technology.

FIG. 3 is a flowchart illustrating an example process for storing data in a solid-state device according to aspects of the subject technology. The example process represented in FIG. 3 may be performed with flash memory, which represents one example of solid-state non-volatile memory used in solid-state devices for data storage. Other types of solid-state non-volatile memory may be used with the subject technology, including those that are organized in finite length pages. Other types of solid-state non-volatile memory may include, without limitation, restrictive random access memory (ReRAM or RRAM), non-volatile static random access memory (nvSRAM), ferroelectric random access memory (FeRAM), magnetoresistive random-access memory (MRAM), spin torque transfer RAM (STTRAM), phase-change memory (PCM or PCRAM), programmable metallization cell memory (PMC), silicon-oxide-nitride-oxide-silicon memory (SONOS), racetrack or domain-wall memory (DWM), and nano-RAM (NRAM). Multiple host data units (for example, sectors) for storage in a solid-state non-volatile memory, for example flash memory, may be received by the controller 201 (302). Host data units may include one or more sectors of data provided by a host system. As discussed above, the host data units may each have the same size.

The multiple host data units are divided among a plurality of data payloads, wherein a first data payload comprises a first host data unit and a second data payload comprises a portion of a second host data unit (304). In this respect, some of the data payloads comprise an entire host data unit and others comprise portions of host data units. Therefore, while the host data units each have the same size, the data payloads may not all have the same size.

The first data payload is encoded into a first codeword having a first codeword size (306). A second data payload is encoded into a second codeword having a second codeword size, the second codeword size being different from the first codeword size (308). As discussed above, the first codeword size and the second codeword size may be based on the capabilities of the ECC encoder/decoder 206.

The first codeword and the second codeword are written to a first page in the flash memory (310). By dividing the second host data unit into multiple data payloads, flash memory storage space can be maximized. For example, referring to FIG. 1, if a page 120a of flash memory has a size of 16 kB and some room for overhead, it may be able to store three codewords 100a-100c having sizes of 4 kB each, plus ECC parity bits. However, the page 120a in flash memory may not have enough room remaining for a fourth 4 kB codeword and the ECC parity bits. Instead, it may have room for a 3 kB codeword 102a, plus the ECC parity bits. If the flash memory did not have enough room remaining for a 3 kB codeword, then the controller 201 may check to see if there is enough room for a 2 kB codeword. If the flash memory did not have enough room remaining for a 2 kB codeword, then the controller 201 may check to see if there is enough room for a 1 kB codeword. If there is not enough room for even the smallest codeword, then a codeword of the largest size, in this example 4 kB, may be written to the next page.

Once the second codeword 102a is written to the first page 120a in the flash memory, a third data payload containing the remaining portion of the second host data unit may be encoded into a third codeword 104a having a third codeword size. In the example above, the second codeword 102a has a size of 3 kB, so the third codeword 104a has a size of 1 kB. The third codeword 104a is written to a second page 120b that is adjacent to the first page 120a. As described above, if there is a command to read a host data unit that is divided across two codewords 102a and 104a on two pages 120a and 120b, the system may decode the two codewords 102a and 104a, and does not read any other data on the first page 120a or the second page 120b to access the requested host data unit.

In order to have as many of the largest codewords written to flash memory as possible, the controller 201 may check to see if one or more codewords of the largest size may be written to the page. In this case, there is enough room for multiple codewords of the largest size, so three more codewords 100d-100f of the first codeword size (in this example, 4 kB) are written to the second page 120b. After writing codeword 104a having a 1 kB codeword size and codewords 100d-100f each having a 4 kB codeword size, the second page 120b, which has a size of 16 kB, cannot fit another 3 kB codeword, but can fit a codeword 106a having a 2 kB codeword size. As described previously, the next host data unit to be stored on the flash memory is divided into two data payloads and encoded to two codewords 106a and 106b. One codeword 106a is written to the second page 120b and the other codeword 106b is written to a third page 106b.

The process continues, using as many of the largest codeword sizes as possible. In FIG. 1, codewords 100g-100l, 102b, 104b are written to pages 120c-120d until a page ends with a codeword of the largest codeword size. In this example, a fourth page 120d ends with a codeword of the largest codeword size 100l. A 1 kB codeword will not fit in the fourth page 120d. The codewords 100a-100l, 102a-102b, 104a-104b, 106a-106b are written and arranged in a pattern of codeword sizes. In this case, the pattern is 4 kB, 4 kB, 4 kB, 3 kB, 1 kB, 4 kB, 4 kB, 4 kB, 2 kB, 2 kB, 4 kB, 4 kB, 4 kB, 1 kB, 3 kB, 4 kB, 4 kB, 4 kB. This same pattern may be repeated when encoding and storing remaining host data units.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously. The accompanying method claims present elements of the various steps in a sample order, and are not meant to be limited to the specific order or hierarchy presented.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples. A phrase such as an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such as a "configuration" may refer to one or more configurations and vice versa.

The word "exemplary" is used herein to mean "serving as an example or illustration." Any aspect or design described herein as "exemplary" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. A method for storing data in a solid-state device, the method comprising:
   receiving a plurality of host data units for storage in a solid-state non-volatile memory;
   dividing the plurality of host data units among a plurality of data payloads, wherein a first data payload comprises a first host data unit and a second data payload comprises a portion of a second host data unit;
   encoding the first data payload into a first error-correcting code (ECC) codeword having a first codeword size;
   encoding the second data payload into a second ECC codeword having a second codeword size, the second codeword size being different from the first codeword size; and writing the first ECC codeword and the second ECC codeword to a first page in the solid-state non-volatile memory, wherein the first ECC codeword and the second ECC codeword comprise a number of parity bits, and wherein the number of parity bits in the first ECC codeword is the same as the number of parity bits in the second ECC codeword.

2. The method of claim 1, further comprising:

encoding a set of data payloads into a plurality of ECC codewords having the first codeword size, wherein the set of data payloads comprises two or more data payloads from the plurality of data payloads; and writing the plurality of ECC codewords having the first codeword size to the first page in the solid-state non-volatile memory.

3. The method of claim 1, wherein a third data payload comprises a remaining portion of the second host data unit, and the method further comprises:

dividing a remaining portion of the second host data unit into a third data payload;

encoding the third data payload into a third ECC codeword having a third codeword size, the third codeword size being different from the first codeword size and the second codeword size; and writing the third ECC codeword to a second page in the solid-state non-volatile memory.

4. The method of claim 3, wherein the first page and the second page are sequential in order in the solid-state non-volatile memory.

5. The method of claim 3, wherein the second page comprises three ECC codewords each having a different codeword size.

6. The method of claim 1, wherein a plurality of ECC codewords are written and arranged in a repeating pattern of codeword sizes across a plurality of pages in the solid-state non-volatile memory.

7. The method of claim 1, wherein the first codeword size and the second codeword size are selected from a plurality of codeword sizes.

8. The method of claim 1, wherein each of the plurality of host data units is of a same size, and wherein the first data payload is of a different size from the second data payload.

9. The method of claim 1, wherein dividing the plurality of host data units among the plurality of data payloads comprises allocating an amount based on a codeword size to be written to the solid-state non-volatile memory.

10. A system, comprising:

a solid-state non-volatile memory;

one or more data buffers configured to receive a plurality of host data units for storage in the solid-state non-volatile memory;

a controller configured to:

divide the plurality of host data units in the one or more data buffers among a plurality of data payloads, wherein a first data payload comprises a first host data unit and a second data payload comprises a portion of a second host data unit; and an encoder/decoder configured to:

encode the first data payload into a first error-correcting code (ECC) codeword having a first codeword size; and encode the second data payload into a second ECC codeword having a second codeword size, the second codeword size being different from the first codeword size, wherein the controller is further configured to write the first ECC codeword and the second ECC codeword to a first page in the solid-state non-volatile memory, wherein the first ECC codeword and the second ECC codeword comprise a number of parity bits, and wherein the number of parity bits in the first ECC codeword is the same as the number of parity bits in the second ECC codeword.

11. The system of claim 10, wherein the encoder/decoder is further configured to encode a set of data payloads into a plurality of ECC codewords having the first codeword size, wherein the set of data payloads comprises two or more data payloads from the plurality of data payloads, and the controller is further configured to write the plurality of ECC codewords having the first codeword size to the first page in the solid-state non-volatile memory.

12. The system of claim 10, wherein a third data payload comprises a remaining portion of the second host data unit, wherein the controller is further configured to divide a remaining portion of the second host data unit into a third data payload, wherein the encoder/decoder is further configured to encode the third data payload into a third ECC codeword having a third codeword size, the third codeword size being different from the first codeword size and the second codeword size, and wherein the controller is further configured to write the third ECC codeword to a second page in the solid-state non-volatile memory.

13. The system of claim 12, wherein the first page and the second page are sequential in order in the solid-state non-volatile memory.

14. The system of claim 12, wherein the second page comprises three ECC codewords each having a different codeword size.

15. The system of claim 10, wherein a plurality of ECC codewords are written and arranged in a repeating pattern of codeword sizes across a plurality of pages in the solid-state non-volatile memory.

16. The system of claim 10, wherein the first codeword size and the second codeword size are selected from a plurality of codeword sizes.

17. The system of claim 16, wherein the plurality of codeword sizes are based on a capability of the encoder/decoder.

18. The system of claim 10, wherein dividing the plurality of host data units among the plurality of data payloads comprises allocating an amount based on a codeword size to be written to the solid-state non-volatile memory.

19. A non-transitory machine-readable media including instructions thereon that, when executed, perform a method, the method comprising:

receiving a plurality of host data units for storage in a solid-state non-volatile memory;

dividing the plurality of host data units among a plurality of data payloads, wherein a first data payload comprises a first host data unit and a second data payload comprises a portion of a second host data unit;

encoding the first data payload into a first error-correcting code (ECC) codeword having a first codeword size;

encoding the second data payload into a second ECC codeword having a second codeword size, the second codeword size being different from the first codeword size; and writing the first ECC codeword and the second ECC codeword to a first page in the solid-state non-volatile memory, wherein the first ECC codeword and the second ECC codeword comprise a number of parity bits, and
wherein the number of parity bits in the first ECC codeword is the same as the number of parity bits in the second ECC codeword.

\* \* \* \* \*